United States Patent
Zogg et al.

(10) Patent No.: US 9,189,662 B2
(45) Date of Patent: Nov. 17, 2015

(54) RFID READING SYSTEM USING RF GRATING

(75) Inventors: Edward Zogg, Ontario, NY (US); Mark P. Hinman, Holley, NY (US); Christopher J. White, Avon, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 595 days.

(21) Appl. No.: 13/532,845

(22) Filed: Jun. 26, 2012

(65) Prior Publication Data

US 2013/0342321 A1    Dec. 26, 2013

(51) Int. Cl.
*H04Q 5/22* (2006.01)
*G06K 7/01* (2006.01)
*G06K 19/073* (2006.01)

(52) U.S. Cl.
CPC ............ *G06K 7/01* (2013.01); *G06K 19/07327* (2013.01)

(58) Field of Classification Search
USPC ........................................................ 340/10.1
See application file for complete search history.

(56) References Cited

U.S. PATENT DOCUMENTS

| | | | |
|---|---|---|---|
| 3,832,530 A * | 8/1974 | Reitboeck et al. ............ | 235/439 |
| 6,236,316 B1 | 5/2001 | Eberhardt et al. | |
| 6,618,132 B1 * | 9/2003 | Vann ............................ | 356/141.1 |
| 6,725,014 B1 | 4/2004 | Voegele | |
| 7,086,587 B2 | 8/2006 | Myllymaki | |
| 7,336,167 B2 | 2/2008 | Olsen, III et al. | |
| 7,859,408 B2 | 12/2010 | Tuttle | |
| 7,969,286 B2 | 6/2011 | Adelbert | |
| 8,025,228 B2 | 9/2011 | Dearing et al. | |
| 8,384,521 B2 * | 2/2013 | Matsen et al. ................ | 340/10.1 |
| 2007/0077888 A1 | 4/2007 | Forster | |
| 2008/0284568 A1 * | 11/2008 | Kumar ......................... | 340/10.1 |
| 2009/0021343 A1 | 1/2009 | Sinha | |
| 2009/0174556 A1 | 7/2009 | Horne et al. | |
| 2009/0302972 A1 | 12/2009 | Osamura et al. | |
| 2010/0102969 A1 | 4/2010 | Svalesen et al. | |
| 2010/0265302 A1 | 10/2010 | Laramie et al. | |
| 2011/0037567 A1 * | 2/2011 | Knadle et al. ................. | 340/10.1 |
| 2012/0037696 A1 | 2/2012 | Lavi | |
| 2012/0075073 A1 * | 3/2012 | Fislage ......................... | 340/10.1 |

\* cited by examiner

*Primary Examiner* — Naomi Small
(74) *Attorney, Agent, or Firm* — Raymond L. Owens (57) ABSTRACT

Apparatus for reading an RFID tag includes an RF-blocking enclosure having a port and adapted to receive through the port a non-RFID-active object having an RFID tag affixed thereto. An RFID reader has a reader antenna located outside the enclosure. The antenna transmits an RF downlink signal in a particular direction. An RF grating is arranged between the reader antenna and the port so that, after the enclosure receives the object having the tag, the port is located in the transmit direction from the reader antenna, and RF energy transmitted from the reader antenna has a selected linear polarization after passing through the grating.

3 Claims, 4 Drawing Sheets

RFID READING SYSTEM USING RF GRATING

CROSS-REFERENCE TO RELATED APPLICATIONS

This application is co-filed with and has related subject matter to U.S. patent application Ser. No. 13/532,821 filed Jun. 26, 2012, titled "RFID SYSTEM WITH MULTIPLE TAG TRANSMIT FREQUENCIES;" U.S. patent application Ser. No. 13/532,859 filed Jun. 26, 2012, titled "RFID SYSTEM WITH ENCLOSURE AND INTERFERENCE PATTERN;" U.S. patent application Ser. No. 13/532,874 filed Jun. 26, 2012, titled "RFID SYSTEM WITH BARRIERS AND KEY ANTENNAS;" U.S. patent application Ser. No. 13/532,831 filed Jun. 26, 2012 now U.S. Pat. No. 8,692,654, titled "RFID SYSTEM WITH MULTIPLE READER TRANSMIT FREQUENCIES;" U.S. patent application Ser. No. 13/532,840 filed Jun. 26, 2012, titled "READING RFID TAG USING ANTENNA WITHIN ENCLOSURE;" and U.S. patent application Ser. No. 13/532,826 filed Jun. 26, 2012, titled "RHO SYSTEM WITH CONFIGURABLE RF PORT;" all of which are incorporated herein by reference.

FIELD OF THE INVENTION

This invention pertains to the field of radio-frequency communication between radio-frequency identification (RFID) tags and RFID readers, and more securing such communication.

BACKGROUND OF THE INVENTION

Various electronic equipment or devices can communicate using wireless links. A popular technology for communication with low-power portable devices is radio frequency identification (RFID). Standardized RFID technology provides communication between an interrogator (or "reader") and a "tag" (or "transponder"), a portable device that transmits an information code or other information to the reader. Tags are generally much lower-cost than readers. RFID standards exist for different frequency bands, e.g., 125 kHz (LF, inductive or magnetic-field coupling in the near field; approximately 2400 m wavelength), 13.56 MHz (HF, inductive coupling 22 m), 433 MHz (70 cm), 860-960 MHz (UHF, e.g., 915 MHz or 33 cm, RF coupling beyond the near field), 2.4 GHz (12.5 cm), or 5.8 GHz (5 cm). Tags can use inductive, capacitive, or RF coupling (e.g., backscatter, discussed below) to communicate with readers. Although the term "reader" is commonly used to describe interrogators, "readers" (i.e., interrogators) can also write data to tags and issue commands to tags. For example, a reader can issue a "kill command" to cause a tag to render itself permanently inoperative.

Radio frequency identification systems are typically categorized as either "active" or "passive." In an active RFID system, tags are powered by an internal battery, and data written into active tags can be rewritten and modified. In a passive RFID system, tags operate without an internal power source, instead being powered by received RF energy from the reader. "Semi-active" or "semi-passive" tags use batteries for internal power, but use power from the reader to transmit data. Passive tags are typically programmed with a unique set of data that cannot be modified. A typical passive RFID system includes a reader and a plurality of passive tags. The tags respond with stored information to coded RF signals that are typically sent from the reader. Further details of RFID systems are given in commonly-assigned U.S. Pat. No. 7,969,286 to Adelbert, and in U.S. Pat. No. 6,725,014 to Voegele, both of which are incorporated herein by reference.

In a commercial or industrial setting, tags can be used to identify containers of products used in various processes. A container with a tag affixed thereto is referred to herein as a "tagged container." Tags on containers can carry information about the type of products in those containers and the source of those products. For example, as described in the GS1 EPC Tag Data Standard ver. 1.6, ratified Sep. 9, 2011, incorporated herein by reference, a tag can carry a "Serialized Global Trade Item Number" (SGTIN). Each SGTIN uniquely identifies a particular instance of a trade item, such as a specific manufactured item. For example, a manufacturer of cast-iron skillets can have, as a "product" (in GS1 terms) a 10" skillet. Each 10" skillet manufactured has the same UPC code, called a "Global Trade Item Number" (GTIN). Each 10" skillet the manufacturer produces is an "instance" of the product, in GS1 terms, and has a unique Serialized GTIN (SGTIN). The SGTIN identifies the company that makes the product and the product itself (together, the GTIN), and the serial number of the instance. Each box in which a 10" skillet is packed can have affixed thereto an RFID tag bearing the SGTIN of the particular skillet packed in that box. SGTINs and related identifiers, carried on RFID tags, can permit verifying that the correct products are used at various points in a process.

However, RFID tags in general, and specifically passive tags, often do not have enough processing power or memory to perform cryptographic authentication or authorization functions, such as secure hashing with time-varying salt. Consequently, every read of a tag returns the same data. As a result, RFID systems can be vulnerable to attacks in which a rogue (non-authorized) reader placed near a tag reads and stores that tag's data. This process is called "skimming," and such rogue readers are referred to as "skimmers." The skimmer can later replay the stored data (a "replay attack") to pretend to be the skimmed tag ("spoofing"). This can result in incorrect products being used in industrial or commercial processes, or mishandled inventory in a retail environment, possibly resulting in lost productivity or wasted product. Skimmers can actively interrogate RFID tags, or passively wait and record data sent by tags being interrogated by authorized readers. In other cases, skimmers can passively record the data transfers by which an authorized reader opens a communications session with an RFID tag. The skimmer can then use this information to open a communications session with the RFID tag and make unauthorized changes to data stored on the tag.

Various schemes have been proposed to reduce vulnerability of RFID systems to skimmers. U.S. Patent Publication No. 2009/0174556 by Home et al. describes an RFID blocker that disrupts an RFID reader's signal to a tag when the blocker is physically near the tag. However, the blocker will disrupt all accesses, not just unauthorized access. In another scheme, U.S. Patent Publication No. 2009/0021343 by Sinha describes jamming or spoofing skimmers, either using authorized electronics or intrusion-prevention tags, in response to intrusions or policy violations. U.S. Pat. No. 7,086,587 to Myllymaki describes RFID readers that can detect unauthorized tags, and tags that can detect unauthorized readers. However, none of these schemes reduces the probability of passive monitoring by a skimmer during an authorized read of the tag. Moreover, tags affixed to objects are often used in factory or retail contexts in which a large number of tagged instances or packages (e.g., as described in U.S. Patent Publication No. 2009/0302972) carry RFID tags. This can result in contention between tags for the bandwidth, reducing the number of tags that can be read in a certain amount of time.

For example, U.S. Patent Publication No. 2010/0265302 describes RFID tags on liquid ink containers. However, this reference does not recognize difficulties that can be encountered in reading RFID tags attached to RF-attenuating containers of liquid. Moreover, containers can come in various sizes and shapes, which can require adjusting antenna directions and gains to read at a desired rate of read success. Various prior-art schemes use readers with directional antennas to reduce the area of operation in which a skimmer can detect that a read is in progress.

U.S. Patent Publication No. 2010/0102969 describes a "Faraday shield" that reduces reading of unwanted RFID objects. This shield affects the radiation pattern of the antennas to reduce their power in the direction of the unwanted objects, but does not control access to tags in the direction of wanted objects. Consequently, an unwanted rogue tag, which could be active instead of passive, and thus much higher-powered than a standard tag, could still be accessed by the reader. Moreover, the shield might increase gain in the wanted direction, making it easier for an attacker to place a rogue tag within range of the reader.

U.S. Patent Publication No. 2009/0174556 by Home et al. describes an RFID blocker that disrupts an RFID reader's signal to a tag when the blocker is physically near the tag. However, the blocker will disrupt all accesses, not just unauthorized access. Moreover, this scheme requires the blocker and the tag be moved apart from each other to access the tag.

There is a continuing need, therefore, for a way of controlling access to RFID tags located in known positions, e.g., attached to containers.

U.S. Pat. No. 8,025,228 describes distribution of products in a restricted access unit near the customer. Products are equipped with RF tags. A plurality of RF tagged products is placed within a cabinet that has a door or opening that can detect access to the cabinet. One or more antennas are positioned within the door. Each antenna may have a transmission line of sight and be configured to emit a signal at predefined frequencies. Each antenna generates an electromagnetic field within the micro-warehouse. In one embodiment, the products are positioned in one or more bins, compartments, or similar devices located within the micro-warehouse such that at least two of the plurality of products are spaced a distance from each other to reduce energy sharing. The electromagnetic field is moved or altered within the micro-warehouse through the use of reflectors, devices that move the antennas, or other mechanisms. However, this scheme is not applicable to environments such as retail stockrooms or production lines in which the tagged items are not confined in a cabinet.

Similar problems exist with reading tags in production environments. Tagged instances or containers, e.g., medicine bottles, are often carried along conveyors through various manufacturing steps on an assembly line. Communicating with the correct tag, especially when instances are closely spaced on the conveyor, can be difficult. It is known to pass instances through a conductive tunnel open at the ends. If the length of the tunnel is long compared to the wavelength of the RF signal, not much signal will enter the tunnel. Gaps can be opened in the tunnel at locations where RFID communication should take place. However, tunnels can be very long for LF or HF RFID operation. Tunnels also restrict access to the conveyor or instances on it, making service and visual inspection more difficult. Other schemes are described in U.S. Pat. Nos. 7,336,167 and 7,859,408, and U.S. Patent Publication No. 2012/0037696, the disclosures of which are incorporated herein by reference.

There is, therefore, a continuing need for ways of reading RFID tags securely, in tag-rich environments.

SUMMARY OF THE INVENTION

According to an aspect of the present invention, there is provided apparatus for reading an RFID tag, comprising:
a) an RF-blocking enclosure having a port and adapted to receive through the port a non-RFID-active object having an RFID tag affixed thereto;
b) an RFID reader having a reader antenna located outside the enclosure, the antenna adapted to transmit an RF downlink signal in a particular direction; and
c) an RF grating arranged between the reader antenna and the port so that, after the enclosure receives the object having the tag, the port is located in the transmit direction from the reader antenna, and RF energy transmitted from the reader antenna has a selected linear polarization after passing through the grating.

An advantage of this invention is that it restricts the locations from which a reader can communicate with a tag. This reduces the range of positions from which a skimmer can monitor tag transmissions. Various embodiments use standard readers and tags and do not require custom security electronics or protocols. Various embodiments use the enclosure to restrict RF energy from the reader to communicate with only one tag at a time. Various embodiments reduce RF crosstalk and permit increasing the read rate.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION OF THE INVENTION

As used herein, the term "uplink" refers to communications from an RFID tag to a reader, and "downlink" to communications from a reader to a tag. These terms are used regardless of which side initiates the communication.

In the following description, some embodiments will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, methods described herein. Other aspects of such algorithms and systems, and hardware or software for producing and otherwise processing the image signals involved therewith, not specifically shown or described herein, are selected from such systems, algorithms, components, and elements known in the art. Given the system as described herein, software not specifically shown, suggested, or described herein that is useful for implementation of various embodiments is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice methods according to various embodiments.

Figure 1:
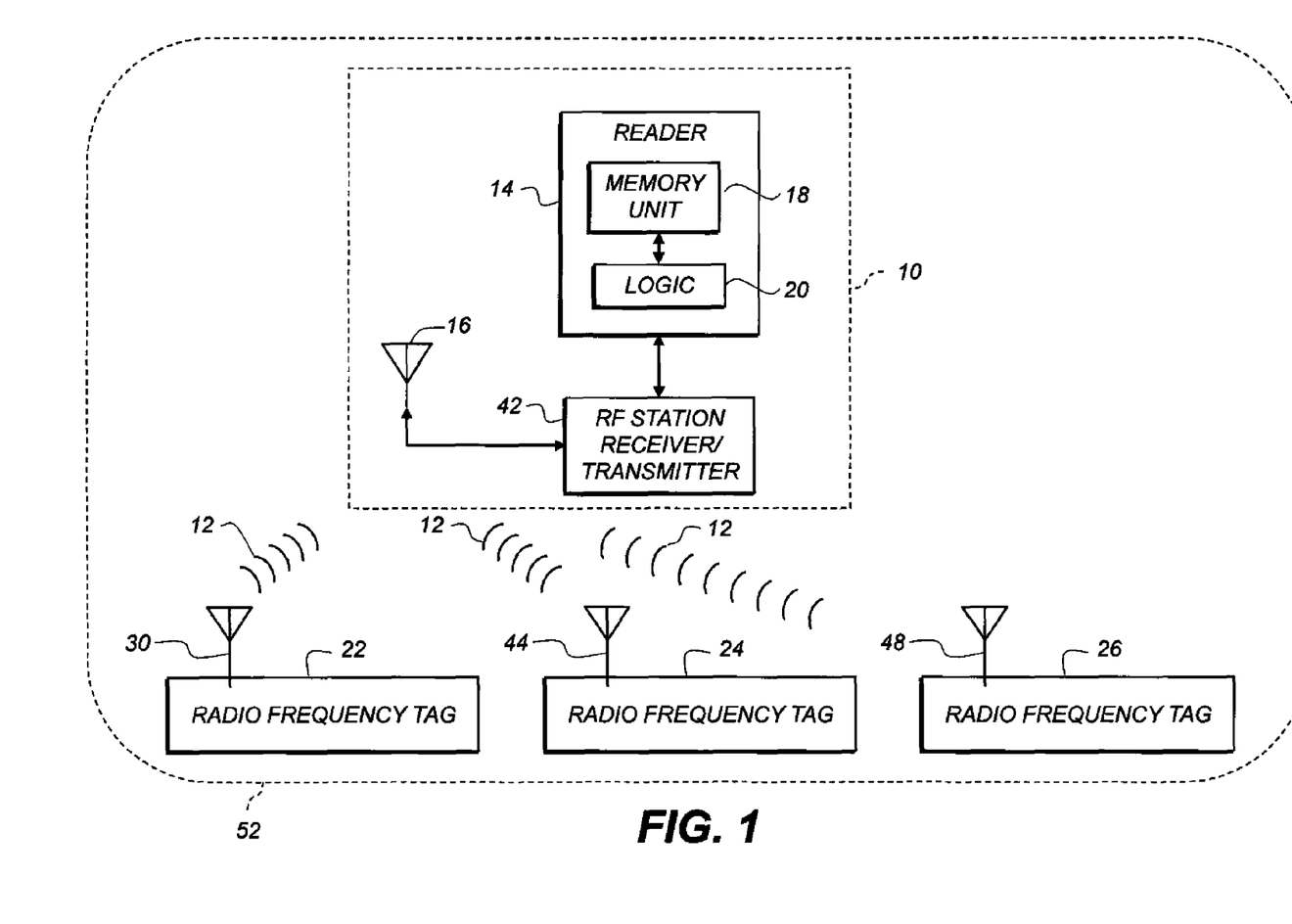
FIG. 1 is a block diagram of an RFID system according to various embodiments.

FIG. 1 is a block diagram of an RFID system according to various embodiments. Base station 10 communicates with three RF tags 22, 24, 26, which can be active or passive in any combination, via a wireless network across an air interface 12. FIG. 1 shows three tags, but any number can be used. Base station 10 includes reader 14, reader's antenna 16 and RF station 42. RF station 42 includes an RF transmitter and an RF receiver (not shown) to transmit and receive RF signals via reader's antenna 16 to or from RF tags 22, 24, 26. Tags 22, 24, 26 transmit and receive via respective antennas 30, 44, 48.

Reader 14 includes memory unit 18 and logic unit 20. Memory unit 18 can store application data and identification information (e.g., tag identification numbers) or SGTINs of RF tags in range 52 (RF signal range) of reader 14. Logic unit 20 can be a microprocessor, FPGA, PAL, PLA, or PLD. Logic unit 20 can control which commands that are sent from reader 14 to the tags in range 52, control sending and receiving of RF signals via RF station 42 and reader's antenna 16, or determine if a contention has occurred.

Reader 14 can continuously or selectively produce an RF signal when active. The RF signal power transmitted and the geometry of reader's antenna 16 define the shape, size, and orientation of range 52. Reader 14 can use more than one antenna to extend or shape range 52. Reader 14 and tags 22, 24, 26 can communicate using, e.g., the EPC Class-1 Generation-2 UHF RFID Protocol for Communications at 860 MHz-960 MHz, Version 1.2.0, Oct. 23, 2008, incorporated herein by reference.

Figure 2:
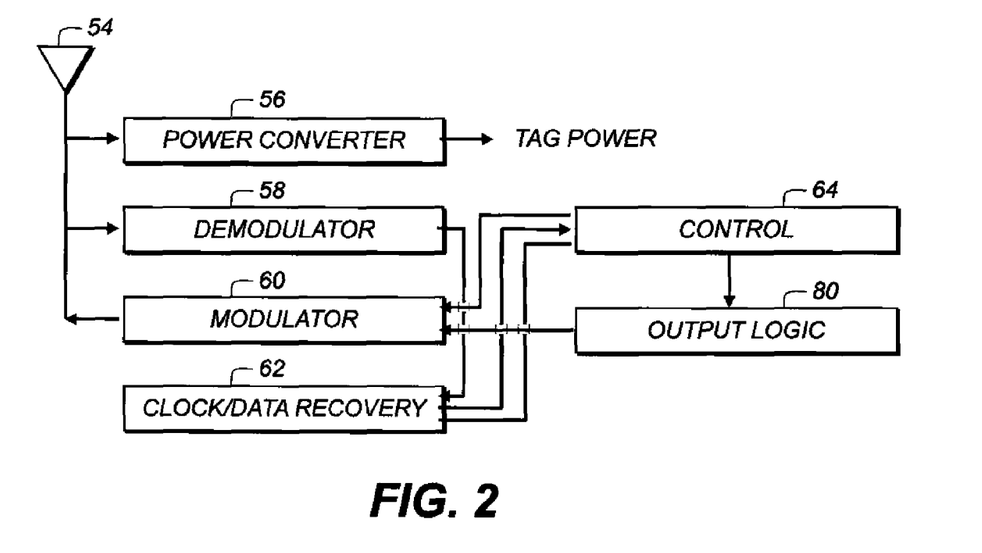
FIG. 2 is a block diagram of a passive RFID tag according to various embodiments.

FIG. 2 is a block diagram of a passive RFID tag (e.g., tags 22, 24, 26 according to an embodiment of the system shown in FIG. 1) according to various embodiments. The tag can be a low-power integrated circuit, and can employ a "coil-on-chip" antenna for receiving power and data. The RFID tag includes antenna 54 (or multiple antennas), power converter 56, demodulator 58, modulator 60, clock/data recovery circuit 62, control unit 64, and output logic 80. Antenna 54 can be an omnidirectional antenna impedance-matched to the transmission frequency of reader 14 (FIG. 1). The RFID tag can include a support, for example, a piece of polyimide (e.g., KAPTON) with pressure-sensitive adhesive thereon for affixing to packages. The tag can also include a memory (often RAM in active tags or ROM in passive tags) to record digital data, e.g., an SGTIN.

Reader 14 (FIG. 1) charges the tag by transmitting a charging signal, e.g., a 915 MHz sine wave. When the tag receives the charging signal, power converter 56 stores at least some of the energy being received by antenna 54 in a capacitor, or otherwise stores energy to power the tag during operation.

After charging, reader 14 transmits an instruction signal by modulating onto the carrier signal data for the instruction signal, e.g., to command the tag to reply with a stored SGTIN. Demodulator 58 receives the modulated carrier bearing those instruction signals. Control unit 64 receives instructions from demodulator 58 via clock/data recovery circuit 62, which can derive a clock signal from the received carrier. Control unit 64 determines data to be transmitted to reader 14 and provides it to output logic 80. For example, control unit 64 can retrieve information from a laser-programmable or fusible-link register on the tag. Output logic 80 shifts out the data to be transmitted via modulator 60 to antenna 54. The tag can also include a cryptographic module (not shown). The cryptographic module can calculate secure hashes (e.g., SHA-1) of data or encrypt or decrypt data using public- or private-key encryption. The cryptographic module can also perform the tag side of a Diffie-Hellman or other key exchange.

Signals with various functions can be transmitted; some examples are given in this paragraph. Read signals cause the tag to respond with stored data, e.g., an SGTIN. Command signals cause the tag to perform a specified function (e.g., kill). Authorization signals carry information used to establish that the reader and tag are permitted to communicate with each other.

Passive tags typically transmit data by backscatter modulation to send data to the reader. This is similar to a radar system. Reader 14 continuously produces the RF carrier sine wave. When a tag enters the reader's RF range 52 (FIG. 1; also referred to as a "field of view") and receives, through its antenna from the carrier signal, sufficient energy to operate, output logic 80 receives data, as discussed above, which is to be backscattered.

Modulator 60 then changes the load impedance seen by the tag's antenna in a time sequence corresponding to the data from output logic 80. Impedance mismatches between the tag antenna and its load (the tag circuitry) cause reflections, which result in momentary fluctuations in the amplitude or phase of the carrier wave bouncing back to reader 14. Reader 14 senses for occurrences and timing of these fluctuations and decodes them to receive the data clocked out by the tag. In various embodiments, modulator 60 includes an output transistor (not shown) that short-circuits the antenna in the time sequence (e.g., short-circuited for a 1 bit, not short-circuited for a 0 bit), or opens or closes the circuit from the antenna to the on-tag load in the time sequence. In another embodiment, modulator 60 connects and disconnects a load capacitor across the antenna in the time sequence. Further details of passive tags and backscatter modulation are provided in U.S. Pat. No. 7,965,189 to Shanks et al. and in "Remotely Powered Addressable UHF RFID Integrated System" by Curty et al., IEEE Journal of Solid-State Circuits, vol. 40, no. 11, November 2005, both of which are incorporated herein by reference. As used herein, both backscatter modulation and active transmissions are considered to be transmissions from the RFID tag. In active transmissions, the RFID tag produces and modulates a transmission carrier signal at the same wavelength or at a different wavelength from the read signals from the reader.

Figure 3:
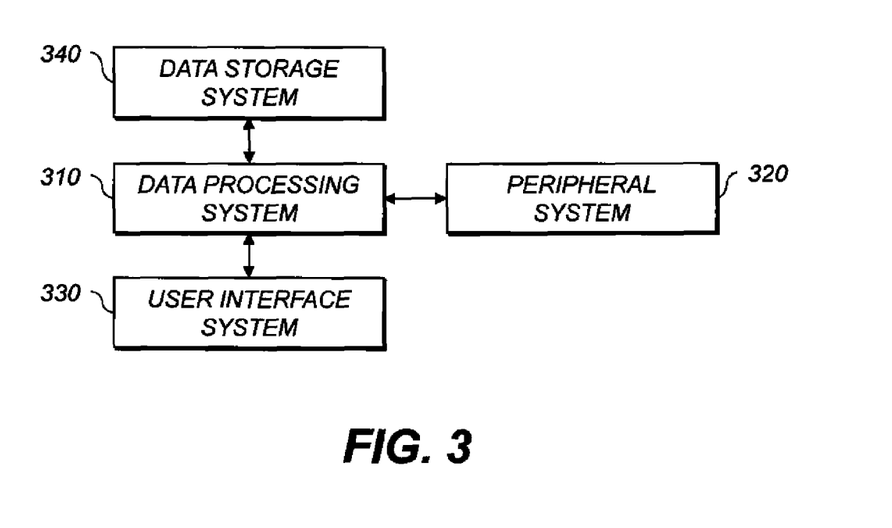
FIG. 3 is a high-level diagram showing the components of a processing system useful with various embodiments.

FIG. 3 is a high-level diagram showing the components of a processing system useful with various embodiments. The system includes a data processing system 310, a peripheral system 320, a user interface system 330, and a data storage system 340. Peripheral system 320, user interface system 330 and data storage system 340 are communicatively connected to data processing system 310.

Data processing system 310 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 340 includes one or more processor-accessible memories configured to store information, including the information needed to execute the processes of various embodiments. Data storage system 340 can be a distributed processor-accessible memory system including multiple processor-accessible memories communicatively connected to data processing system 310 via a plurality of computers or devices. Data storage system 340 can also include one or more processor-accessible memories located within a single data processor or device. A "processor-accessible memory" is any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" refers to any type of connection, wired or wireless, between devices, data processors, or programs in which data can be communicated. This phrase includes connections between devices or programs within a single data processor, between devices or programs located in different data processors, and between devices not located in data processors at all. Therefore, peripheral system 320, user interface system 330, and data storage system 340 can be included or stored completely or partially within data processing system 310.

Peripheral system 320 can include one or more devices configured to provide digital content records to data processing system 310, e.g., digital still cameras, digital video cameras, cellular phones, or other data processors. Data processing system 310, upon receipt of digital content records from a device in peripheral system 320, can store such digital content records in data storage system 340. Peripheral system 320 can also include a printer interface for causing a printer to produce output corresponding to digital content records stored in data storage system 340 or produced by data processing system 310.

User interface system 330 can include a mouse, a keyboard, another computer, or any device or combination of devices from which data is input to data processing system 310. Peripheral system 320 can be included as part of user interface system 330. User interface system 330 also can include a display device, a processor-accessible memory, or any device or combination of devices to which data is output by data processing system 310. If user interface system 330 includes a processor-accessible memory, such memory can be part of data storage system 340 even though user interface system 330 and data storage system 340 are shown separately in FIG. 1.

Figure 4:
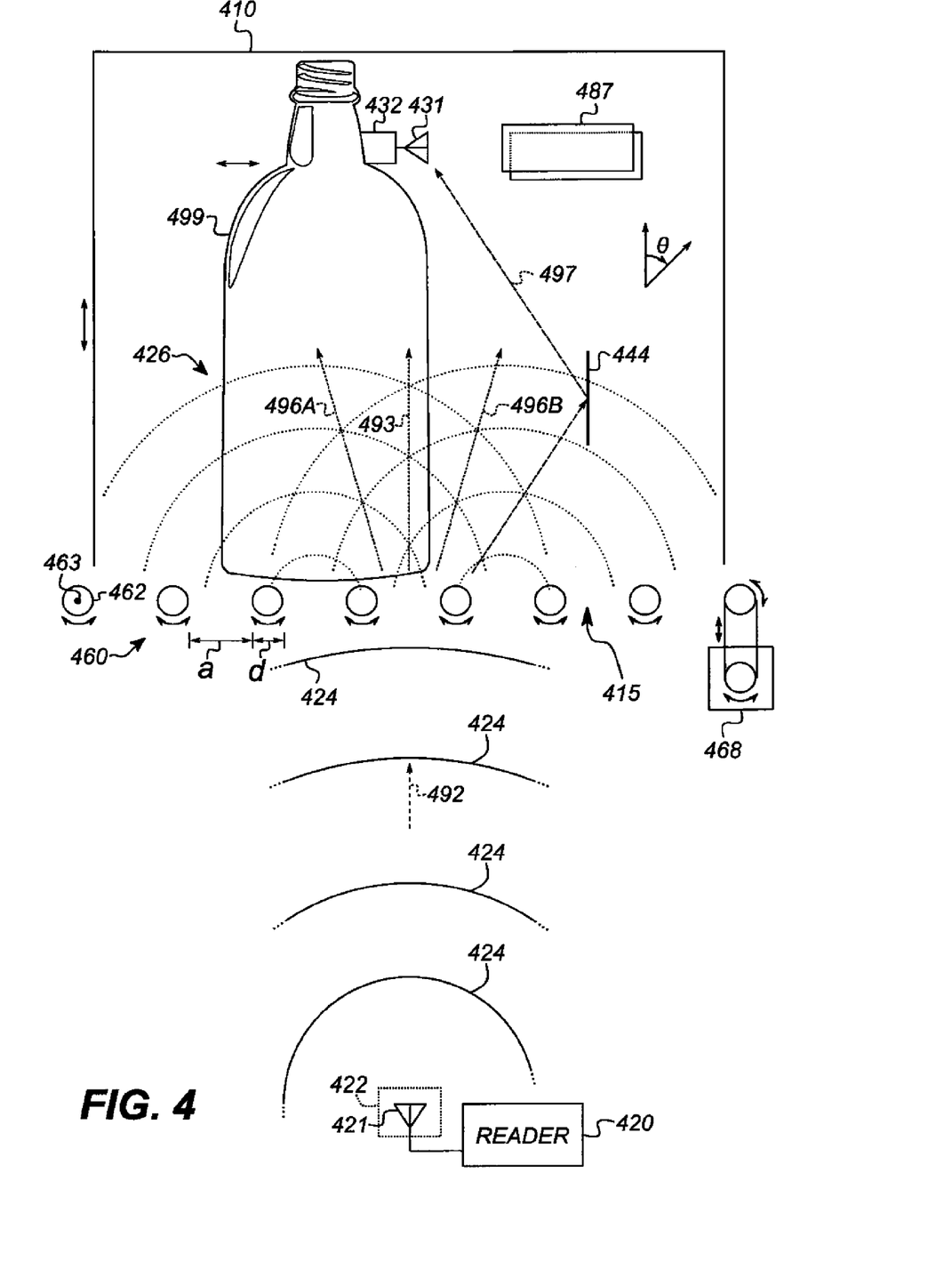
FIG. 4 is an elevation of RFID systems according to various embodiments.

FIG. 4 shows an RFID system. RFID reader 420 has reader antenna 421 located at reader-antenna location 422, outside enclosure 410. RFID reader 420 is adapted to transmit a downlink signal at a selected RF downlink frequency or band (range) of frequencies and to receive an uplink signal at a selected RF uplink frequency (or band/range). The uplink and downlink signals can use the same or different frequencies or frequency bands. Examples of circular wavefronts 424 are shown propagating from antenna 421. As each wavefront 424 approaches enclosure 410, its radius increases and it more closely approximates a plane wave. Antenna 421 is adapted to transmit in a particular direction 492 with a selected beam width (wide or narrow).

RF-blocking enclosure 410 is spaced apart from RFID reader 420. Enclosure 410 can include a single piece or multiple pieces brought together. Enclosure 410 can include a door (not shown) that can open to permit putting tags in and taking them out of enclosure 410, or enclosure 410 can include multiple parts (e.g., a body and a lid, not shown) that can be separated to access tag 432, then put back together to reform enclosure 410.

RF-blocking enclosure 410 substantially blocks RF energy at selected RFID wavelength(s) except through port 415, as is discussed below. "Blocking" means that enclosure 410 is designed (e.g., in shape or material) to attenuate incident RF energy, e.g., from a skimmer, until the energy that passes into the enclosure is below the receive sensitivity of the RFID tag, or the response from the RFID tag is below the receive sensitivity of a reader or skimmer outside the enclosure. It is not required that the enclosure be entirely RF-opaque, whether only at a frequency of interest or over a frequency band.

RFID tag 432 is located in enclosure 410. Tag 432 can be active, semi-active, or passive. Tag 432 can include a controller (not shown), which can include a CPU, microcontroller, PLD, PLA, PAL, FPGA, ASIC, or other logic or software-execution device, to control the operation of tag 432. In various embodiments, tag 432 includes a battery (not shown).

Tag 432 includes tag antenna 431 located in enclosure 410. The tag can be multiple pieces or one assembly. The RFID IC holding the controller can be inside or outside enclosure 410. Tag 432 is adapted to transmit an uplink signal using tag antenna 431. In various embodiments, tag antenna 431 is sensitive to a selected polarization, e.g., a circular polarization. That is, tag antenna 431 is configured to transmit or backscatter RF energy with the selected polarization. In various embodiments, reader antenna 421 has a polarization matching the selected polarization.

Since the downlink signal from reader antenna 421 is directed by RF grating 460, the range of propagation of wavefronts 424 to tag antennas 431 is physically limited. In various embodiments, this permits spacing reader antennas 421 more closely than would normally be the case for a selected level of read performance. In various embodiments, multiple readers 420 and respective reader antennas 421 are used at different points along conveyor 560 (FIG. 5) or adjacent to different, adjacent conveyors. RF gratings 460 restrict the signal range of each reader 420 so that normal read modes can be used in situations which would require dense-reader mode if RF grating 460 were not in use. Since dense-reader mode prevents two nearby readers from communicating with tags simultaneously, using RF grating 460 to separate the signals spatially rather than using dense-reader mode to separate them temporally advantageously increases the number of tags that can be read in a given time, permitting an increase in the speed of conveyor 560 and of a production line of which it is part. RF grating 460 can also provide a corresponding advantage in other environments in which, without RF grating 460, tag antenna 431 would be within the range of two different readers 420 with respective antennas 421.

Port 415 can be an opening in enclosure 410, optionally selectively covered with a gate or other RF blocker. Enclosure 410 can receive non-RFID-active object 499 through port 415. In an example, enclosure 410 raises to admit object 499 and lowers over object 499. Object 499 has RFID tag 432 affixed thereto. In the example shown, object 499 is a bottle.

RF grating 460 is arranged between reader antenna 421 and port 415 in enclosure 410. After enclosure 410 receives object 499 having tag 432, port 415 is located in transmit direction 492 from reader antenna 421. RF energy transmitted from reader antenna 421 has a selected linear polarization after passing through grating 460. Grating 460 can include or be attached to a roller conveyor or an RF-blocking stacked pallet.

In various embodiments, tag antenna 431 of RFID tag 432 is sensitive to a linear polarization. Turner 487 orients object 499 within enclosure 410 so that tag antenna 431 is sensitive to the selected linear polarization, i.e., the polarization of the downlink signal after passing through RF grating 460. Turner 487 can be disposed entirely or partly inside enclosure 410, or entirely or partly outside enclosure 410. Turner 487 can orient object 499 before it enters enclosure 410 or while it is in enclosure 410. Turner 487 can include a gripper, diverter, belt, gimbal, castor, feed screw, labeler, magnet, ball transfer table, air pallet, robot, or air knife or jet. Turner 487 can also include a plurality of omni wheels. Turner 487 can also include a plurality of MECANUM wheels, e.g., as described in U.S. Pat. No. 3,876,255 to Ilon, incorporated herein by reference, which permit moving object 499 in any direction or rotating it in either direction a desired amount. An example of a conveyor using MECANUM wheels is the GSE EUROPE PL-14 container pallet loader. In this example, turner 487 is a pair of spaced-apart beams through which the neck of object 499 is passed from right to left. If tag 432 is not aligned as shown, object 499 will be rotated by force of the beams against tag 432.

In various embodiments, RF grating 460 includes a plurality of rotatable members 462 (for clarity, only one is labeled). These members can include cylinders, drums, or belts entrained around rotatable drive or idler elements. Each member 462 includes a respective axial metal element 463. Members 462 can be metal themselves, in which case member 462 is element 463. Members 462 can also include metal cores or metal shells with nonmetallic support or coating members. In various embodiments, the width of each member 462 normal to the direction of the RF downlink signal from reader 420 is at least the wavelength of the RF downlink signal. In various embodiments, the outer diameters (or outer surfaces, for non-circular members 462) of adjacent members 462 are separated by at most one-fifth of the wavelength of the RF downlink signal.

In general, grating 460 includes a plurality of spaced-apart members that block RF energy with RF-transparent slits between them. The width of the slits a along the short dimension thereof (here, left-to-right) is much less than the wavelength λ of the incident RF energy. For example, a can be <0.5λ or <0.1λ. This provides narrow-slit diffraction instead of wide-slit diffraction. The width of the members d can be less than λ, in which case significant energy will only pass through grating 460 in direction 493 parallel to direction 492. Examples are discussed herein for the far-field (Fraunhofer) approximation in which the distance the downlink signal at the downlink wavelength travels from grating 460 to antenna 431 is significantly greater than width a.

Width d can also be greater than λ, in which case energy will also pass through grating 460 in directions 496A, 496B. This is because, for angle θ off the normal to grating 460, for radiation incident to grating 460 along the normal thereto, significant energy passes through at angles having α=2 πm, for integers m and $$\alpha = \frac{2\pi d \sin\theta}{\lambda} \quad \text{(Eq. 2)}$$

With d>λ, α can reach or exceed 2π, producing an energy peak. This is described further in sec. 9.2 of "Interference and Diffraction" by Dr. David Morin, Lecturer on Physics at Harvard, available online and incorporated herein by reference. Directions 496A, 496B correspond to values of θ for which α is an integral multiple of 2π. Subject to the selected constraints on d and a with respect to λ, any width, spacing, or number (>2) of members or elements can be used, including more than one element 463 per member 462. The number and configuration of members in port 415 can be selected, using grating-design techniques known in the art, to provide a desired interference pattern 426. For clarity, only wavefronts emanating from two slits between members 462 are shown; however, in practice, wavefronts from many slits contribute to interference pattern 426. MATLAB, ANSYS MAXWELL, or other field-solver software programs can be used to determine interference pattern 426 for a selected configuration of grating 460.

In an example, 2.4 GHz signals (~12.5 cm) are used. Grating 460 has five elements, each of which includes a metal belt entrained around two drive rollers. The spacing between adjacent elements is a≈1 cm. Each element is d~20 cm wide. Direction 493 therefore has θ=0°, direction 496A has θ≈−38.7°, and direction 496B has θ≈+38.7°, since at those values of θ, α is an integral multiple of 2π. (α is on [−kd, kd], here approximately [−10.05, 10.05].)

In another example, the configuration above is used, except that each element is d≈30 cm wide. There are then five peaks, at 0° and approximately ±24.6° and ±56.4°. Direction 497 is approximately −56.4°, the reflection of reflector 444 oriented normal to grating 460 of the +56.4° peak.

For incident plane waves, the orientation of the interference pattern inside enclosure 410 depends on the direction of incidence of the waves. This restricts the set of locations from which a skimmer can reach tag 432, reducing the probability that skimmers will be able to access tag 432 without detection.

For example, in a factory environment, antenna 421 is located at the appropriate location (reader-antenna location 422) to communicate with tag 432. The location of antenna 421 and reader 420 can be selected so that if skimmer hardware is installed in place of the normal hardware, that change will be visible to factory personnel.

In various embodiments, at least some of the rotatable members are driven, e.g., by motor 468. RF grating 460 is therefore adapted to convey object 499 into and out of enclosure 410.

In various embodiments, object 499 is an RF-attenuating, RF-absorbing, or RF-blocking object. RFID tag 432 is affixed to an upper surface of object 499. An "upper surface" is a surface of object 499 positioned or oriented so that RF energy from reader 420 passing through grating 460 does not strike the upper surface without first passing through at least a portion of the bulk of, or another surface of, object 499. Enclosure 410 includes at least one reflector 444 arranged to direct the linearly-polarized RF energy from reader 420 passing through grating 460 onto RFID tag antenna 431. In various examples, object 499 is a barrel, drum cask, or other container and the upper surface is a surface of a cork, bottle neck, labels, bottle closure, or lid. In various examples, object 499 is a metalized package or a package placed on a foil or other conductive tray, and the upper surface is any surface screened from the RF downlink signal by the foil or metal.

In some embodiments, object 499 is the retail or wholesale packaging, e.g., a cardboard box, for an instance. In an example, object 499 is wrapped in foil and enclosure 410 has an RE-reflective inner surface. Object 499 is arranged in enclosure 410 to define a waveguide that carries RF energy from a peak of interference pattern 426 corresponding to a downlink signal from reader 420 in reader-antenna location 422 to tag antenna 431.

RF power can be measured with respect to the noise floor of the receiver in tag 432 or reader 420, as appropriate. Downlink or uplink signal power can be selected so the signal-to-noise (S/N) ratio of the signal at the appropriate receiver exceeds the receiver's sensitivity threshold. In an example, a skimmer with an antenna not along direction 492 results in an interference pattern 426 with the center beam pointing in other than direction 493. As a result of the attenuation of the downlink signal power away from the peaks of interference pattern 426, the skimmer cannot provide enough power to communicate with tag 432 via antenna 431. In various embodiments, tag 432 is a passive tag and the RF downlink power is at least the power required to energize tag 432.

In various embodiments, enclosure 410 further includes RF-attenuating material (not shown) on at least one inside surface thereof. In various embodiments, RE-attenuating material is disposed over substantially all the inside surfaces of enclosure 410 except for port 415. This substantially reduces reflections, simplifying the determination of downlink-signal interference pattern 426 in enclosure 410. In various embodiments, the material and thickness of the material forming enclosure 410 are selected to provide a desired degree of RF-energy absorption or reflection at the downlink or uplink frequencies.

In various embodiments, the enclosure includes two or more portions that are mechanically disconnected. At least one of the portions can be moved to position the enclosure. The portion can be moved by a motor, piston, or other actuator, directly or through a belt, gear train, rack and pinion, or any combination.

Figure 5:
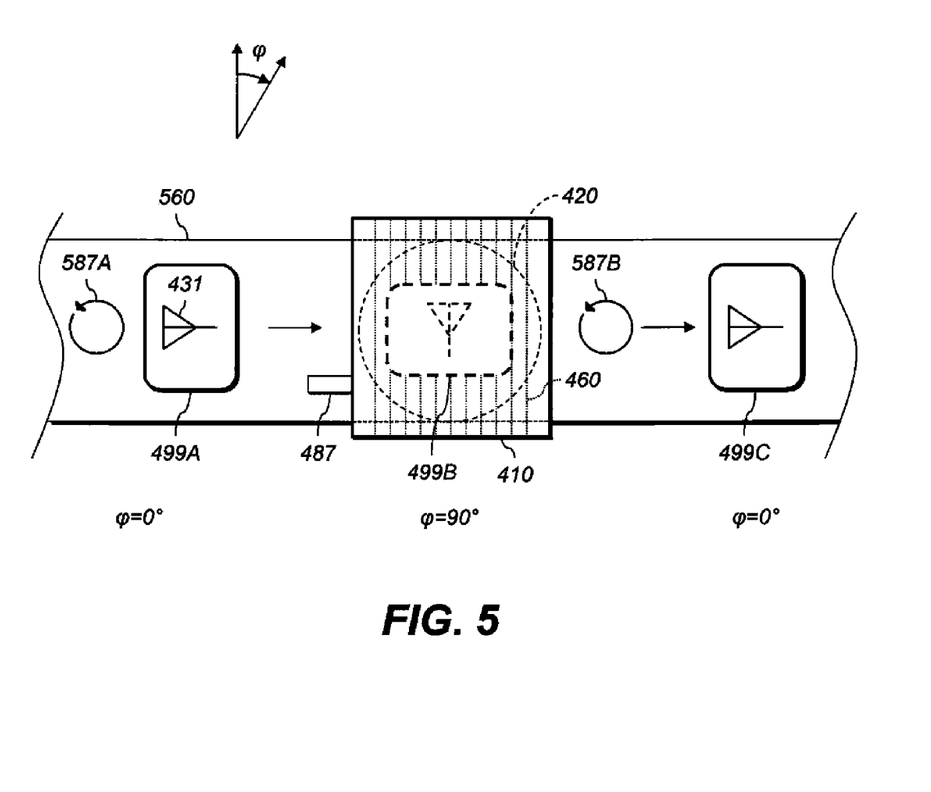
FIG. 5 is a plan of RFID systems according to various embodiments.

FIG. 5 is a plan of RFID systems according to various embodiments. RF grating 460 is disposed adjacent to a non-RF-blocking conveyor 560, shown here carrying tagged objects 499A, 499B, 499C from left to right. Tag antenna 431 is shown on objects 499A, 499B, 499C, but, for clarity, is only labeled on object 499A. Grating 460 includes a plurality of RF-blocking members extending across the direction of motion of conveyor 560. (In other embodiments, grating 460 is the conveyor.) Reader 420 is beneath grating 460. Objects 499A, 499B, 499C have respective orientations in yaw angle φ, as indicated.

In this example, object 499B is conveyed between reader 420 and raised enclosure 410 (FIG. 4). Enclosure 410 is then lowered, and RF communications are carried out with tag 432 (FIG. 4). Grating 460 greatly restricts the range of angles at which RF energy can reach the objects 499A, 499B, 499C on the conveyor, advantageously reducing crosstalk. Moreover, RF grating 460 can pass linearly-polarized RF signals.

As discussed above, in various embodiments, turner 487 orients object 499 in enclosure 410 so that linear-polarization-sensitive antenna 431 is oriented to communicate with reader 420. In this example, turner 487 is a fixed member that abuts against the bottom of an object (e.g., object 499B) as it passes under enclosure 410 so that the force rightward from conveyor 560 rotates object 499B to the correct orientation (here, φ=90°).

In various embodiments, turners 587A, 587B (represented graphically by arrows) orient objects outside enclosure 410 (here, objects 499A, 499C) so that antennas 431 on objects 499A, 499C are not oriented to communicate with reader 420. For example, objects 499A, 499C can pass down the conveyor belt with φ=0°, except when actively being read (object 499B, φ=90°). This advantageously further reduces the probability of crosstalk by reducing the gain of tag antennas 431 on objects 499A, 499C outside enclosure 410. Specifically, turners 587A, 587B orient objects 499A, 499C so tag antennas 431 thereon are sensitive to a second linear polarization different from the selected linear polarization (e.g., at right angles thereto).

Turners 587A, 587B can include any of the components described above for turner 487 (FIG. 4), e.g., a plurality of MECANUM wheels arranged in a grid and independently controlled. This configuration permits rotating objects 499A, 499B, 499C without stopping their forward motion. Conveyor 560 can include belt sections and separate MECANUM sections that together convey objects 499A, 449B, 499C. Turner 587A can be located where objects 499A are placed on conveyor 560. Turner 587B can be located within enclosure 410 or downstream of enclosure 410.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST 10 base station
12 air interface
14 reader
16 reader's antenna
18 memory unit
20 logic unit
22, 24, 26 RFID tag
30, 44, 48 antenna
42 RF station
52 range
54 antenna
56 power converter
58 demodulator
60 modulator
62 clock/data recovery circuit
64 control unit
80 output logic
310 data-processing system
320 peripheral system
330 user-interface system
340 data-storage system
410 enclosure
415 port
420 reader
421 reader antenna
422 reader-antenna location
424 wavefront
426 interference pattern
431 antenna
432 RFID tag
444 reflector
460 RF grating
462 member
463 metal element 468 motor
487 turner
492 direction
493, 496A, 496B direction
497 direction
499, 499A, 499B, 499C object
560 conveyor
587A, 587B turner
a, d width
θ angle
φ yaw angle

The invention claimed is:

1. Apparatus for reading an RFID tag, comprising:
   a) an RF-blocking enclosure having a port and adapted to receive through the port a non-RFID-active object having an RFID tag affixed thereto;
   b) an RFID reader having a reader antenna located outside the enclosure, the antenna adapted to transmit an RF downlink signal in a particular direction;
   c) an RF grating arranged between the reader antenna and the port so that, after the enclosure receives the object having the tag, the port is located in the transmit direction from the reader antenna, and RF energy transmitted from the reader antenna has a selected linear polarization after passing through the grating; and
   wherein the RF grating includes a plurality of rotatable members including respective axial metal elements, and the width of each cylinder normal to the direction of the RF downlink signal is at least the wavelength of the RF downlink signal.

2. The apparatus according to claim 1, wherein at least some of the plurality of rotatable cylinders are driven, so that the RF grating is adapted to convey the object into and out of the enclosure.

3. The apparatus according to claim 1, wherein the outer diameters of adjacent cylinders are separated by at most one-fifth of the wavelength of the RF downlink signal.

* * * * *